Aug. 22, 1967   H. R. BILLETER   3,337,011
BRAKING ARRANGEMENT FOR RAILWAY TRAILER CARS
Filed May 9, 1966   2 Sheets-Sheet 1

INVENTOR.
HENRY R. BILLETER

PARKER & CARTER
ATTORNEYS

Aug. 22, 1967  H. R. BILLETER  3,337,011
BRAKING ARRANGEMENT FOR RAILWAY TRAILER CARS
Filed May 9, 1966  2 Sheets-Sheet 2

INVENTOR.
HENRY R. BILLETER

PARKER & CARTER
ATTORNEYS

# United States Patent Office 3,337,011
Patented Aug. 22, 1967

3,337,011
BRAKING ARRANGEMENT FOR RAILWAY
TRAILER CARS
Henry R. Billeter, Deerfield, Ill., assignor to Sloan Valve Company, Chicago, Ill., a corporation of Illinois
Filed May 9, 1966, Ser. No. 548,530
10 Claims. (Cl. 188—197)

This invention relates in general to braking systems for railway cars and more particularly to a new and improved braking arrangement for railway cars of the trailer type such as are used in "piggy back" service.

An object of this invention is to provide separate and individual sets of braking equipment for each end of a long trailer type railway car, which equipment is associated and controls the brakes of only one end of the car thereby eliminating the usual excessively long brake rods, and reducing the numerous levers and brake rigging usually required for the full length of the car when only a single set of brake control equipment is employed. Advantages accruing from the above object result in a reduction of the possibility of damage to the linkage, weight reduction, and reduced friction load on the rigging, affecting the braking force. Also eliminated are the cut out sections in the car frame resulting in structural weakness, and which are usually provided to accommodate brake rods and other linkage.

Another object is to design a new and improved braking arrangement for a car truck located at one end of a trailer railway car, in which the brake cylinder is connected to one end of the linkage and the slack adjuster is connected at the other end of the linkage, while the associated brake rods, and levers are arranged between the two elements, all suitably located on each side of the truck and bolster without interference therewith, and all in a compact manner above the car truck and wheels.

Railway flat cars, such as are commonly used for transporting auto trailers "piggy back," are usually about 50 feet long and can accommodate only a single auto trailer of standard size or at the most two auto trailers of relatively short length. Since the present tendency is to employ auto trailers about twice as long for economical reasons, there has been developed a need for freight cars which will carry one or more of the longer auto trailers. These longer flat cars posed the problem of providing proper brake control equipment since the excessive length of the trailer cars precluded the use of the standard single braking control equipment such as the brake cylinder, slack adjuster, etc., usually located at one end of the car.

The novel braking arrangement, according to the present invention, provides individual and separate slack adjusters and brake cylinders as well as other equipment at each end of the long trailer car, so that the power stroke of the brake cylinder can be considerably less and may be only one half the stroke formerly required, since it is effective on only one set of brakes on a single car truck. The size of the brake cylinder can, therefore, be much smaller. As a further result o fthe shorter brake cylinder stroke the slack aljuster need only correct for shorter slack conditions and can also be made shorter so as to more readily fit into the end of the trailer car. With such an arrangement it will also be apparent that failure of the braking equipment at one end of the trailer car will not affect the braking equipment at the other end of the car.

Another object of the invention is to provide a braking arrangement suitable for a railway car truck where alignment of the brake equipment and wheels will be maintained regardless of any lateral movement between the wheel and axle assemblies and the brake system and wherein the operating angularity of the levers is greatly reduced.

A further object is to provide a braking mechanism which will permit relative movement between the car body and the truck when the railway car is going around curves without in any way affecting the slack adjuster.

A further object is to greatly minimize the effect of friction in the linkage by anchoring the brake cylinder, the slack adjuster and the operating levers directly to the car frame rather than to the truck or bolster.

Another object of the invention is the provision of an arrangement wherein the slack adjusting means is connected at one end of the dead lever and the brake cylinder is connected to one end of the cylinder lever, with the brake actuating levers and linkage connected between them.

It will be understood that while the invention is described for convenience in connection with "trailer" type railroad cars, it is applicable equally as well to other types of railroad cars such as box cars, tank cars, flat cars, and any railroad cars of relatively long length, where separate and independent sets of braking equipment according to the present invention, may be installed at each end of the railroad car.

The invention consists in the various features of construction, operation and combination of parts, and in the unique relations of the various members and relative proportioning and disposition thereof, as will be more fully pointed out hereinafter in the appended drawings in which:

FIGURE 3 is a side view of a fragmentary portion of the car showing the slack adjuster; while

In illustrating the invention, only those parts and elements of a railway car necessary to a clear understanding of the same have been illustrated and it will be also understood that although only one car truck and associated braking equipment has been illustrated and described as being located at one end of the railway car, the truck and braking equipment at the other end of the car will be an exact duplicate and independent in operation thereof.

Figure 2:
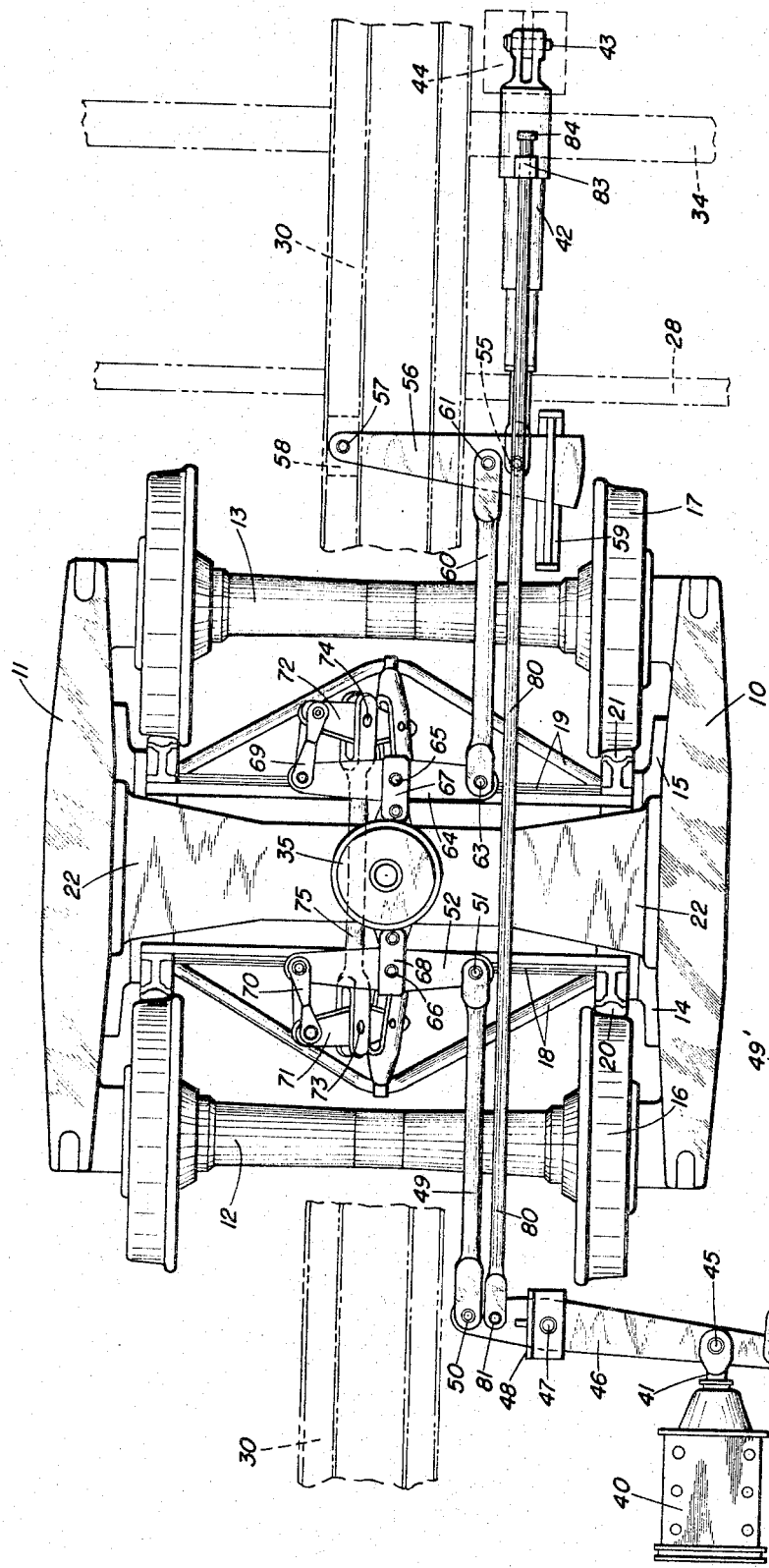
FIGURE 2 is a top plan view of a car truck with certain parts shown in broken lines.

Referring now particularly to FIGURE 2 the car truck illustrated and located at one end of the railway car has the side frames 10 and 11 connected to the usual wheel and axle assembly 12 and 13, and each side frame has guides 14 and 15 located adjacent the wheels 16 and 17 for supporting and guiding the brake beams 18 and 19, carrying the brake shoes 20 and 21 on one side of each wheel. The bolster 22 moves up and down in the side frames 10 and 11 in the well known manner supported by the usual springs (not shown) in the side frames.

Figure 4:
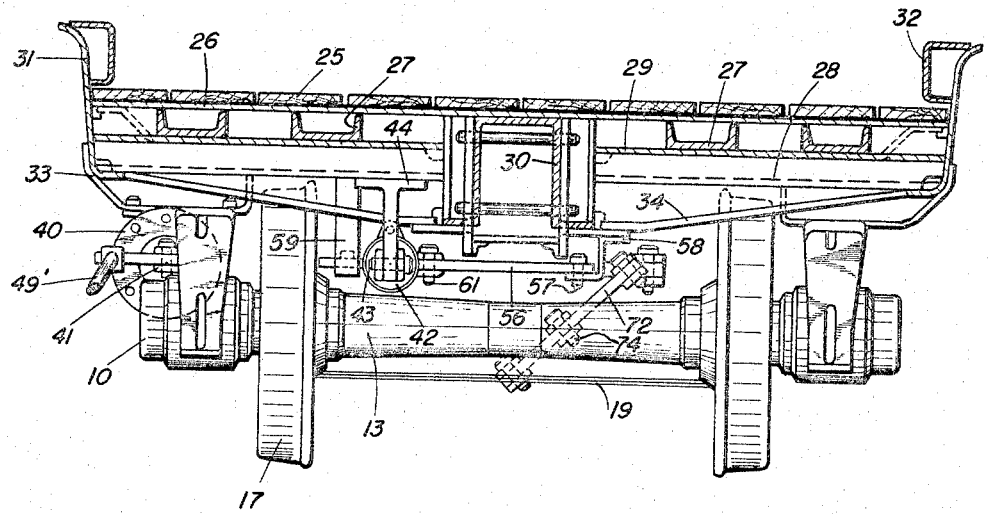
FIGURE 4 is a right hand sectional end view of FIGURE 1.

The trailer car has a flat bed 25 (FIGURE 4) to which the auto trailers that are carried on it are suitably anchored during transit. A metal floor 26 for supporting the flat bed 25 is in turn supported by U-shaped beams 27 extending lengthwise of the car. Cross ties 28 and 29 arranged at intervals along the car bed serve to strengthen the car bed and support certain brake equipment in position, as will be pointed out hereinafter. The usual U-shaped center sill 30 extends the length of the railway car and also serves to support some of the braking equipment. Side members such as 31 and 32 extend the full length of the car and also serve as reinforcement for the flat bed 26. It will be understood that the foregoing arrangement of car body and supports is conventional and departures from the structure are readily conceivable. The pivotal center plate 35 on the bolster 22 carries the car frame for swinging movement of the car truck in the usual manner.

The brake control equipment concerned with the present invention includes the brake cylinder 40 mounted on the bracket 33 beneath the car frame and on the outboard side of the wheels 16 and braking equipment. It has the usual push rod 41 which is projected from the brake cylinder whenever a brake application is made. A slack adjuster 42 is located outside of the brake shoe and wheel 17 and on the opposite side of the car truck from the brake cylinder 40. One end of slack adjuster 42 is pivoted at 43 to a bracket 44 in turn suitably welded to the underside of cross tie 29. The slack adjuster 42 may be of any automatic type and is arranged to automatically take up and let out slack as wear takes place in the brake shoes and other places in the linkage, or when new shoes are installed.

The brake cylinder push rod 41 is pivotally connected by pin 45 for operation of the cylinder lever 46 adjacent the lower end of the lever. Cylinder lever 46 is fulcrumed by pin 47 to a bracket 48 suitably attached to a portion of the car frame, and at its upper end has one end of pull rod 49 pivotally connected thereto by pin 50. The lower end of cylinder lever 46 is pivotally connected to the end of a conventional hand brake connecting linkage 49' extending along the side of the car to a hand wheel. Pull rod 49 extends inwardly and is pivoted at its other end by pivot 51 to one end of actuating lever 52 located on one side of the bolster 22.

Figure 3:
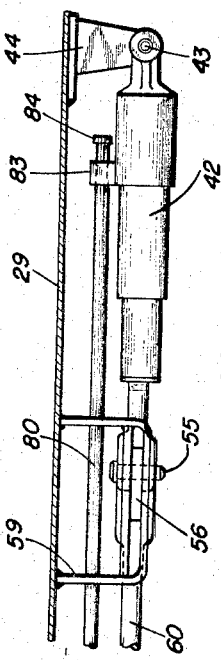

The slack adjuster 42 at its operating end is pivoted by pin 55 to one end of a dead lever 56, in turn fulcrumed at its other end by pivot pin 57 to a bracket 58. This bracket 58 is suitably welded to a supporting bracket 34. A guiding bracket 59 for the movable lower end of dead lever 56 is also suitably welded to a cross tie 29 on the underside of the car deck as shown in FIGURE 3. A second pull rod 60 has one end pivoted by pin 61 intermediate the ends of dead lever 56 and adjacent pivot pin 55 of the slack adjuster 42. The other end of pull rod 60 extends inward and is pivoted by pin 63 to one end of a second actuating lever 64 on the other side of bolster 22 from the actuating lever 52. Both levers 52 and 64 are pivoted at their mid points 65 and 66 respectively, to a link member 67 and 68, which link members in turn are pivoted as shown to the bolster 22 for articulated movement therewith. The upper ends of actuating levers 52 and 64 are pivoted to link members 69 and 70, the other ends of which links connect pivotally to the upper ends of two brake levers 71 and 72. The lower ends of brake levers 71 and 72 connect pivotally in the conventional manner with the usual brake beams and truss bars 18 and 19 for application of the brakes 20 and 21 to the wheels 16 and 17. Each brake lever 71 and 72 is also pivotally connected at its center fulcrum point 73 and 74 with the push rod 75 extending across and through openings in the bolster 22.

Figure 1:
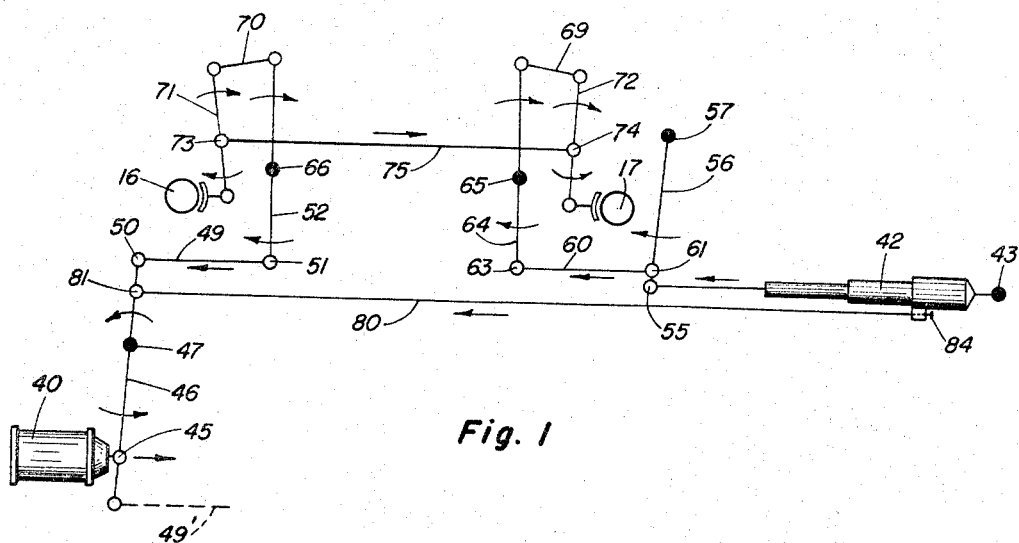
FIGURE 1 is a diagrammatic showing of the braking linkage arrangement.

The movement of the various levers and tie rods and their pivotal action is illustrated clearly in the diagrammatic showing in FIGURE 1. Referring again to FIGURE 2, responsive to a brake application, the brake cylinder 40 projects its push rod 41 outward resulting in cylinder lever 46 being swung to the right at its lower end about pivot 47 and its upper end shifted to the left thereby pulling the pull rod 49 also to the left. This results in the lower end of actuating lever 52 being swung about its fulcrum 66 so that its upper end pulls the link member 70 to the right. This action in turn causes brake lever 71 along with its pivot 73, to swing to the right to thereby, at its lower end, effect movement of the brake beam 18 and application of the brake shoes 20 to the wheels 16. The push rod 75 being attached to pivot 73 forces the brake lever 72 to the right at its pivot 74, and at the lower end of brake lever 72 the movement is transmitted to the brake beam 19 to cause the brake shoes 21 to frictionally engage the wheels 17. At its upper end brake lever 72 pulls the link 69 to the right and pivots actuating lever 64 about its fulcrum 65. As a result the lower end of actuating lever 64 at pivot 63 pulls the pull rod 60 to the left so that at the opposite end pull rod 60 at its pivotal connection 61, swings the dead lever 56 about its pivot 57. Since the slack adjuster 42 is pivoted at 55 to the lower end of dead lever 56, this device will automatically operate to maintain optimum brake shoe clearance and the brake cylinder stroke at each brake application.

In the event that there is a need for letting out slack as when new brake shoes are installed, the slack adjuster 42 will automatically introduce additional slack and provide further movement to the brake cylinder push rod 41 and the various levers and push rods, so that the brake shoes will not drag. This slack let out automatically takes place in the slack adjuster as the braking action takes place.

Should there be an excessive amount of slack present in the braking system as a result of brake shoe wear, or wear in the pivots and levers of the system, the action of the slack adjuster 42 is to take up the slack upon release of the brakes. To provide for such action the brake cylinder 40 must maintain the stroke of its push rod 41 within a definite distance as provided by railroad regulations. This regulation stroke is maintained by the provision of a trigger rod 80 pivoted to cylinder lever 46 at one end by pivot 81 and extending across the bolster 22 and braking equipment and through a bracket 83 fastened to the casing of slack adjuster 42. A stop 84 on the end of trigger rod 80 engages the bracket 83 whenever the trigger rod 80 is pulled to the left a specified amount to signify a need for slack take up to control the action of the slack adjuster. A suitable type of slack adjuster which may be used herein is disclosed in application Ser. No. 415,968, filed Dec. 4, 1965, for "Double Acting Slack Adjuster."

It is apparent from the foregoing description that the novel arrangement of the braking linkage equipment is such that the brake cylinder 40 and cylinder lever 46 are located at one end of the linkage for operating the same, and the slack adjuster 42 is connected at the other end of the linkage to the dead lever 56. This arrangement insures that the slack adjuster is not required or forced to overcome friction to interfere with its reliable control operation as would be the case where it is connected at some intermediate point in the brake rigging, as is customary.

Due to the fact that the brake equipment including the brake cylinder and slack adjuster are located and associated with only a single truck, the levers and tie rods are made shorter, a weight and friction reduction is effected, and the slack adjuster can be made to effect its slack control within shorter distances. Because the end of the slack adjuster 42 is pivoted at 43 for vertical movement with respect to the car up and down movement during transit, no false take up or operation can take place.

It is to be noted that the relatively short pull rods 49 and 60 are arranged in substantial alignment with one another and their pivoted ends connected in alignment with the ends of the actuating levers 52 ad 64 and the cylinder and dead levers 46 and 56, respectively. This line up insures that the power action of the brake cylinder 40 will be transmitted directly in line with the slack adjuster 42 through the intermediary of the various levers. No side sway or angular stresses are thereby incurred and the slack adjuster is not forced to overcome friction stresses. The trigger rod 80 is also in parallel relationship with the pull rods 49 and 60 thereby insuring its direct and positive control action upon the slack adjuster. This simple trigger rod 80, it is noted, extends directly from the cylinder lever 46 across the bolster 22 and truck equipment to the slack adjuster 42, without intervening linkage guides, or frictional surfaces that could effect its reliable operation.

With the arrangement of the braking equipment as defined by the present invention, a brake application will not adversely affect the action of the slack adjuster since there is no tendency to swivel the truck or wheels at that time, as there is practically no angularlity to the power stroke or variation thereof. The parts are all balanced against one another there being no link, tie rod, or lever connected to the side or ends of the truck or bolster, except the actuating levers 52 and 64 at their center fulcrums, where they are also pivoted to links 67 and 68 to the center pivot post 35. The arrangement also results in balanced loads on the braking effort because the brake cylinder is directly connected to one end of the system and the slack adjuster at the other end, with the braking linkage evenly distributed therebetween.

While there has been illustrated and described a preferred embodiment of the invention, it is to be understood that the invention is capable of many variations and modifications, and it is desired therefore, not to be limited to the precise details set forth, but only those changes and variations as may fall within the scope of the appended claims.

What is claimed is:

1. In a braking arrangement for a railway car, a car truck having associated braking equipment arranged between the car wheels and the bolster, a brake cylinder and a slack adjuster both supported on said car on opposite ends of said car truck, a cylinder lever operatively connected to said brake cylinder on the same end of said car truck as said brake cylinder, a dead lever operatively connected to said slack adjuster on the same end of said car truck as said slack adjuster, a separate actuating lever on each side of said bolster operatively connected to the braking equipment, a first pull rod pivotally connecting said cylinder lever with one of said actuating levers, a second pull rod pivotally connecting the dead lever with the other of said actuating levers, said pull rods and their pivots being arranged in substantial alignment with one another and with said slack adjuster, and extending outward from each end of said car truck towards said cylinder lever and dead levers respectively.

2. In a braking arrangement for railway cars having a car truck and associated braking equipment arranged between the car wheels and bolster, a brake cylinder and a slack adjuster each supported on said car on opposite ends of said truck, a cylinder lever pivotally supported on said car and operatively connected to said brake cylinder on the same side of said truck as said brake cylinder, a dead lever pivotally supported on said car and operatively connected to said slack adjuster on the same side of said truck as said slack adjuster, a separate actuating lever on each side of said bolster operatively connected to said braking equipment including a brake rod extending between said actuating levers, separate pull rods pivotally connecting said actuating levers with said cylinder lever and said dead lever respectively, said pull rods being arranged in substantial alignment with one another and their pivots and with said slack adjuster, whereby the operation of said brake cylinder results in the application of braking forces in a direct line with said slack adjuster, reducing the tendency of said truck to swerve upon brake application.

3. The braking arrangement as claimed in claim 2 in which the cylinder lever is fulcrumed at a center point while the brake cylinder is pivoted at one end of the cylinder lever and the associated pull rod is pivoted at the other end.

4. The braking arrangement as claimed in claim 2 in which the cylinder lever is fulcrumed at a mid point to the car frame, the brake cylinder is pivoted at one end of the cylinder lever and the associated pull rod is pivoted at the other end, and in which the dead lever is fulcrumed at one end to the car frame, the slack adjuster is pivoted at the other end of the dead lever, and the associated pull rod is pivoted at the same end of the dead lever with the slack adjuster.

5. The braking arrangement as claimed in claim 2 in which a trigger rod is pivoted at one end to said cylinder lever adjacent the associated pull rod and extends across said truck parallel to both said pull rods to an operative connection with said slack adjuster for controlling the action of the same.

6. The braking arrangement as claimed in claim 2 in which there is a trigger rod pivoted at one end to said cylinder lever adjacent the associated pull rod and which extends across the truck and bolster parallel to both pull rods to an operative connection with the slack adjuster to control the action of the same, and in which the trigger rod also extends parallel to the slack adjuster and its pivoted connection with the dead lever.

7. In a braking arrangement for a railway car, a car truck having associated braking equipment arranged on the bolster between the car wheels, a brake cylinder supported on said car on one end of said truck, a slack adjuster supported on said car on the opposite end of said truck, a cylinder lever fulcrumed on said car frame, a dead lever fulcrumed on said car frame, said brake cylinder being pivoted to said cylinder lever and said slack adjuster to said dead lever, separate actuating levers fulcrumed to opposite sides of the car bolster, a first pull rod pivoted on each of its ends connecting said brake cylinder with one of said actuating levers, a second pull rod pivoted on each of its ends connecting said slack adjuster with the other of said actuating levers, the pivoted ends of said first and second pull rods being in substantial alignment with one another and with said slack adjuster, intermediate brake levers connected to opposite ends of said actuating levers, said brake levers being operatively connected to said braking equipment, and a tie rod connecting said brake levers for transmitting braking power from said brake cylinder through all of said levers and pull rods to said braking equipment and said slack adjuster.

8. In a braking arrangement for a railway car, there being a separate set of braking equipment located at each end of the railway car and associated with an individual car truck, each set of braking equipment including a brake cylinder arranged on one side of the car truck and a slack adjuster on the opposite side of the car truck, a cylinder lever fulcrumed intermediate its ends to the car frame and pivotally connected at one end to the brake cylinder, a dead lever fulcrumed to the car frame at one end and pivotally connected at its other end to one end of said slack adjuster, a first pull rod pivotally connected to the opposite end of each cylinder lever from said brake cylinder, a second pull rod pivotally connected to the end of said dead lever adjacent the pivoted end of said slack adjuster, the other end of said slack adjuster being pivotally connected to the car frame, said pull rods and said slack adjuster being arranged in substantial alignment with one another, a pair of actuating levers pivoted intermediate their ends on opposite sides of said car truck, one end of one actuating lever being connected to said first pull rod and one end of the other actuating lever being connected to said second pull rod, and intermediate brake operating linkage connecting the opposite ends of said actuating levers with the brake equipment on each side of said car truck for operation of the same.

9. In a braking arrangement for railway cars having a car truck at each end thereof, independent braking and control equipment at each end of the railway car, each comprising a brake cylinder and a slack adjuster together with associated brake rigging connected therebetween, said brake rigging including a cylinder lever fulcrumed intermediate its ends to the car frame, said brake cylinder being pivotally connected to one end of said cylinder lever, a first pull rod pivotally connected to the other end of said cylinder lever, a dead lever fulcrumed at one end to the car frame, said slack adjuster being pivotally connected to the other end of said dead lever, a second pull rod pivotally connected to said dead lever on the same end thereof with said slack adjuster, said slack adjuster being fulcrumed at its other end to the car frame, a pair of actuating levers each fulcrumed intermediate their ends to opposite sides of said car truck and between the wheels and braking assemblies thereof, one end of one of said actuating levers being pivotally connected to said first pull rod, one end of the other said actuating lever being pivotally connected to said second pull rod, a pair of brake levers each connected to said actuating levers on the ends opposite said pull rods, and a tie rod extending across said bolster and connecting the pivot points of said brake levers.

10. In a braking arrangement for a railway car having a car frame and a car truck including associated braking equipment arranged between the car wheels, a cylinder lever and a dead lever, said cylinder lever being pivoted to the car frame intermediate its ends on one side of the car frame, a brake cylinder supported on the car frame on one side of said car truck and having an operating push rod pivoted to one end of said cylinder lever for actuating the same, a pull rod pivoted to the opposite end of said cylinder lever and extending towards said braking equipment in operative engagement therewith, said dead lever being pivoted to the car frame at one of its ends and on the other side of said truck from said cylinder lever, a slack adjuster supported on the car frame on the other side of said car truck from said brake cylinder, said slack adjuster being pivoted to the other end of said dead lever for actuation thereby, a second pull rod pivoted to said dead lever on the same end as said slack adjuster, said second pull rod extending towards said braking equipment in operative connection therewith, both of said pull rods extending across said car truck in substantial direct alignment with one another and with their pivotal connections at each end thereof and with said slack adjuster, and a trigger rod pivoted at one end to said cylinder lever and at its other end connected to said slack adjuster, said trigger rod extending in substantial parallel relationship with both of said pull rods and closely adjacent thereto, said trigger rod also extending across said car truck and car wheels.

References Cited
UNITED STATES PATENTS

| | | | |
|---|---|---|---|
| 1,191,953 | 7/1916 | Drayer | 188—197 |
| 2,176,177 | 10/1939 | Hankins | 188—52 |
| 2,183,850 | 12/1939 | Baselt | 188—52 |
| 2,840,191 | 6/1958 | Helsten | 188—33 |

DUANE A. REGER, *Primary Examiner.*